United States Patent [19]

Gross

[11] Patent Number: 5,071,172
[45] Date of Patent: Dec. 10, 1991

[54] FLUID DIRECTION TUBE INSERTION ASSEMBLY AND INSERTION METHOD

[75] Inventor: Todd A. Gross, Dearborn Heights, Mich.

[73] Assignee: Ford Motor Company, Dearborn, Mich.

[21] Appl. No.: 462,521

[22] Filed: Jan. 9, 1990

[51] Int. Cl.⁵ .............................................. F16L 39/00
[52] U.S. Cl. ................................ 285/137.1; 29/432.2; 29/423
[58] Field of Search ..................... 285/137.1, 131, 138, 285/26, 423; 29/432.2

[56] References Cited

U.S. PATENT DOCUMENTS

| | | | |
|---|---|---|---|
| 2,534,690 | 12/1950 | Young | 248/68 |
| 2,661,483 | 12/1953 | Turtorice | 4/191 |
| 3,135,535 | 6/1964 | Shepard | 285/137.1 |
| 3,285,552 | 11/1966 | Becker | 248/68 |
| 3,436,803 | 4/1969 | Sarnoff | 29/432.2 |
| 3,469,863 | 9/1969 | Riester et al. | 285/137.1 |
| 3,654,965 | 4/1972 | Gramain | 285/137.1 |
| 3,757,824 | 9/1973 | Parkhurst et al. | 285/137.1 |
| 3,811,711 | 5/1974 | Tarkenton | 281/110 |
| 3,933,379 | 1/1976 | Portigny | 285/381 |
| 4,172,496 | 10/1979 | Metnik | 165/76 |
| 4,479,668 | 10/1984 | Jacquet | 285/137 R |
| 4,588,543 | 5/1986 | Huebner | 264/248 |
| 4,611,831 | 9/1986 | Trucket | 285/26 |
| 4,650,222 | 3/1987 | Cetrone | 285/137.1 |
| 4,667,987 | 5/1987 | Knebel | 285/137.1 |
| 4,754,993 | 7/1988 | Kraynul | 285/137.1 |
| 4,773,956 | 9/1988 | Gross | 156/294 |
| 4,893,845 | 1/1990 | Bartholomew | 285/131 |
| 4,900,065 | 2/1990 | Houck | 285/137.1 |

Primary Examiner—Eric K. Nicholson
Attorney, Agent, or Firm—Damian Porcari; Roger May

[57] ABSTRACT

A fluid direction tube insertion assembly for simultaneously inserting two or more fluid direction tubes into an automobile engine body or part thereof. The fluid direction tube insertion assembly includes at least two thermoplastic fluid direction tubes which preferably have a coefficient of thermal expansion about the same as the automobile engine body or part thereof into which they are to be inserted and a flexible bracket which is sufficiently flexible that is may be flexed during insertion of the fluid direction tubes into corresponding receiving bores in the engine body to provide proper alignment/orientation of the fluid direction tubes with the corresponding receiving bore. The fluid direction tube insertion assembly may be either a one-piece molded one or may be of separately molded fluid direction tubes and a separately moded flexible bracket which are subsequently joined.

20 Claims, 1 Drawing Sheet

FLUID DIRECTION TUBE INSERTION ASSEMBLY AND INSERTION METHOD

CROSS REFERENCE TO RELATED APPLICATIONS

Reference is made to related copending application Ser. No. 418,426, filed Oct. 6, 1989 entitled "Throttle Modulator Assemblies and Thermoplastic Fluid Direction Tubes for Insertion Therein," the disclosure of which is hereby incorporated by reference.

BACKGROUND OF THE INVENTION

The present invention generally relates to a fluid direction tube insertion assembly and, more particularly, it relates to a fluid direction tube insertion assembly having at least two fluid direction tubes with a flexible bracket therebetween, and it relates to a method of making such an assembly, and to a method for inserting the same into bores in an automobile engine body or part thereof such as a throttle modulator body.

The use of steel fluid direction tubes in EFI throttle modulator bodies has been extensive and is well known in the art. A common problem experienced in the automotive industry is the cracking of the aluminum or plastic EFI throttle modulator bodies and other parts of automobile engine bodies resulting from the high pressure required to insert steel fluid direction tubes, such as air by-pass tubes, into the automobile engine body or parts thereof. Furthermore, not all of the resulting cracks can be detected during manufacture.

In particular, improper orientation and improper location of the insertion tubes may result upon installation into the throttle modulator bodies. This problem is particularly accute where more than one fluid direction tube is to be inserted. For example where two fluid direction tubes are to be inserted side-by-side into a throttle modulator body there is an orientation, alignment problem if a simultaneous insertion method is used and there is a spacing/interference problem is a sequential insertion method is used. In either event a problem in obtaining an effective seal may result.

In other art areas the sealing problem has resulted in the use of sealing rings, flanges or other devices to assure a tight fit. See, for example Costello U.S. Pat. No. 2,979,050 which discloses a header assembly for space heaters wherein exhaust tubes are retained within a plate by virtue of the exhaust tube's rib and flanged end and Pfeil U.S. Pat. No. 3,279,532 which discloses a heat exchanger wherein the tubes are retained in proper position within support plates by the use of an O-ring and a flared outer end. See also the U.S. patents to Cunningham (U.S. Pat. No. 4,781,400) and Meneses (U.S. Pat. No. 2,453,669) which disclose tubular coupling assemblies having at least one annular bead or ring for facilitating the joining of a tube to the coupling. The use of an annular bead or O-ring provides uniformity for longitudinal insertion but does not always alleviate the improper orientation and location problems incurred during the installation.

Likewise in other art areas the orientation problem for multiple tubes has resulted in the use of support brackets. See, for example Melnyk U.S. Pat. No. 4,172,496 which discloses a heat exchanger assembly having a plurality of fluid carrying tubes which are connected by at least one tube-to-tube joint. Similarly, Jacquet U.S. Pat. No. 4,479,668, Truchet U.S. Pat. No. 4,661,831 and Becker U.S. Pat. No. 3,285,552 all disclose using support brackets for pipes which are separate parts. All of these references employ rigid structures for the sole purpose of providing support for rigid, usually steel, tubes. However, there remains a need for a tube insertion assembly that not only provides a seal and support, but also provides for the tubes to be self-aligned within their respective insertion bores.

In this regard reference is made to Sarnoff U.S. Pat. No. 3,436,803 which shows uniting a hypodermic needle to a hub of thermoplastic material by the use of vibration. The hypodermic needle is a rigid metallic needle not capable of compressing and stretching and thus, requires the use of vibrational forces when attempting to insert the needle into the hub. However, Sarnoff does not provide a way of aligning the hypodermic needle with the hub. Further, Sarnoff requires vibrational forces since the needle is made from a rigid material and does not have a bracket capable of stretching ,and compressing. Similarly, Pontigny U.S. Pat. No. 3,933,379 relates to a separable coupling between two tubes. Pontigny discloses a rigid metallic plate secured to thermoplastic tubes which are to be inserted into a coupling. As mentioned above, the rigid metallic plate or bracket is not capable of stretching and compressing so as to self-align the tubes with the insertion holes.

Finally, reference is made to Tarkenton U.S. Pat. No. 3,811,711 which relates to an adapter for connecting a plurality of circular pipes to a rectangular tube to form conduits for electrical wires. The Tarkenton adaptor or bracket is used for "receiving" tubes rather than providing a self-aligning "insertion" assembly.

As can be seen from the state of the art, there is the need for a method for simultaneously inserting two or more fluid direction tubes into bores in an automobile engine body or part thereof and for a fluid direction tube insertion assembly for use in the insertion method and for a method for making such a fluid direction tube insertion assembly.

SUMMARY OF THE INVENTION

The present invention provides a fluid direction tube insertion assembly and insertion method designed to satisfy the aforementioned needs.

The fluid direction tube insertion assembly of the present invention may be used in the automobile industry for simultaneously inserting two or more fluid direction tubes into an automobile engine body or part thereof such as a throttle modulator body. The fluid direction tube insertion assembly preferably has at least two thermoplastic fluid direction tubes joined in a spaced relationship by a flexible bracket having a centrally located neck and openings to concentrically surround each of the tubes.

Preferably the thermoplastic fluid direction tubes are made of the same materials as the thermoplastic fluid direction tubes disclosed in copending application Ser. No. 418,426. That is, the thermoplastic fluid direction tube has as the major component thereof a thermoplastic annular and hollow tube made from a thermoplastic material having a coefficient of thermal expansion about the same as that of the automobile engine body or part thereof into which it is to be inserted, which is preferably aluminum. Thus, the preferred coefficient of expansion is about 2.5 m/m/°C. at a temperature range from about −40° to about 140° C. The preferred thermoplastic materials include mineral/glass reinforced ones such as glass-reinforced thermoplastic polyester resins and glass-reinforced polyetherimide resins.

Preferably the flexible bracket is made of a thermoplastic material which has a greater degree of flexible modulus than the thermoplastic materials used for the thermoplastic fluid direction tubes. For example the flexural bracket may be made of an engineering elastomer such as one of the ones which has good flexural modulus and flame retardant characteristics. In this instance the thermoplastic fluid direction tubes may be separately manufactured as by injection molding and then joined to the flexible bracket by pressure fitting or bonding the fluid direction tubes in the openings in the separately formed flexible bracket to form the fluid direction tube insertion assembly.

Alternatively the flexible bracket may be made of the same material as the thermoplastic fluid direction tubes. In this instance, forming of the entire fluid direction tube insertion assembly as a unitary, one-piece molded one is possible. However, when doing so, in order to achieve the desired degree of flexibility for the flexible bracket, it is necessary to use a relatively thin bracket, i.e., one having a thickness on the order of about 0.5-0.75 mm, and it is desirable to mold the bracket into a slightly concave (when facing the engine body) shape.

In either event, because of the flexibility of the bracket it is possible to adjust the orientation/alignment of the fluid direction tubes with the receiving bores in the automobile engine body or part thereof to prevent misalignment. In that regard, it is desirable that the radii of the arcs of the flexible bracket concentrically surrounding each fluid direction tube be proportional to the range of adjustment desired for assuring insertion into normal tolerances of misalignment of bores in an automobile engine body.

Likewise, in order to insure proper insertion into the receiving bores, it is desirable that each bore has a chamfer in it so that each fluid direction tube, which has a corresponding chamfer on it, is brought into alignment during the insertion process. It is also desirable that the outside diameter of each of the thermoplastic fluid direction tubes be slightly larger than the diameter of the corresponding receiving bore so that an air tight pressure fit is obtained.

With this arrangement good tube retention is assured at all operating temperatures. Because the coefficient of thermal expansion is about the same as the engine body or part thereof, which is preferably aluminum, there will not be any substantial differential in expansion/contraction. Therefore the tightness of the pressure fit will remain relatively constant. In fact, tests have shown that efforts to remove the thermoplastic fluid direction tubes of the preferred embodiment from the bores at various temperatures results in the tubes breaking before removal.

Likewise, if the insertion pressure is too great or there is a misalignment (both of which are unlikely with the insertion method of the present invention) the thermoplastic fluid direction tubes again break before the engine body or part thereof is cracked. Because a broken fluid direction tube is more easily detected than a engine body or part thereof, this, too, is an advantage of the present invention.

In the most preferred embodiment, the fluid direction tube insertion assembly of the present invention includes three fluid direction tubes of which an inboard tube and outboard tube have the same diameter and a third central tube has a smaller diameter. All three fluid direction tubes are equally spaced apart and connected together by the flexible bracket. The bracket concentrically surrounds each of the aforementioned tubes.

Accordingly, it is an object of the present invention to provide a fluid direction tube insertion assembly capable of self aligning itself when two or more fluid direction tubes are inserted into the sometimes misaligned bores in an automobile engine body. It is also an object of the present invention to provide a method of manufacturing such a fluid direction tube insertion assembly and a method for using such an assembly for simultaneously inserting two or more fluid direction tubes into bores in an automobile engine body or part thereof. Other objects and advantages of the invention will be apparent from the following description, the accompanying drawings and the appended claims.

DETAILED DESCRIPTION OF THE PREFERRED EMBODIMENT

Figure 1:
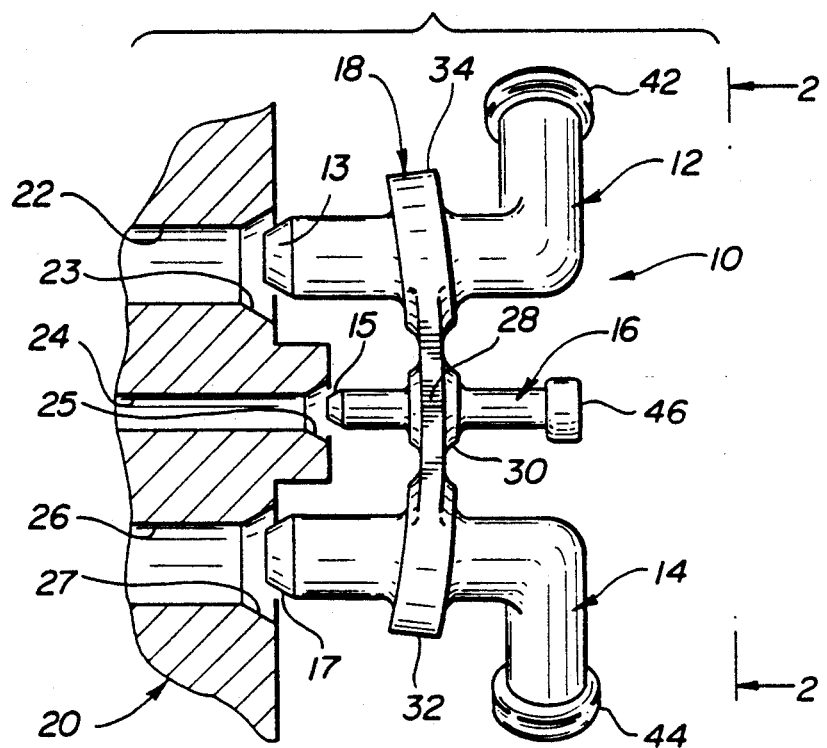
FIG. 1 is a side view of the fluid direction tube insertion assembly ready to be inserted into an automobile engine body.
Figure 2:
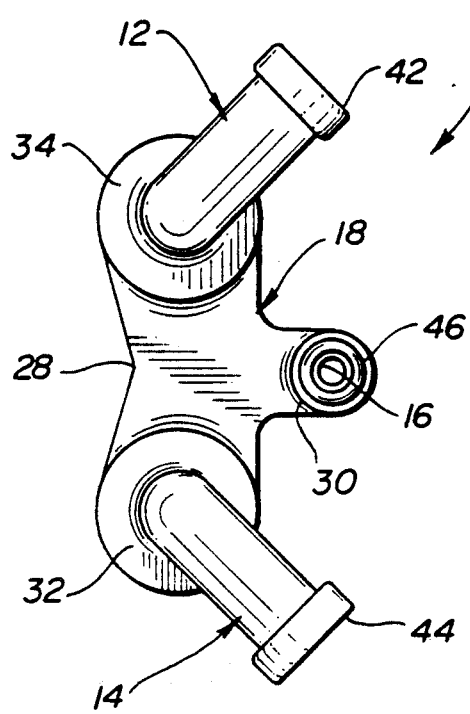
FIG. 2 is a top view of the fluid direction tube insertion assembly of FIG. 1 taken along line 2—2.
Figure 3:
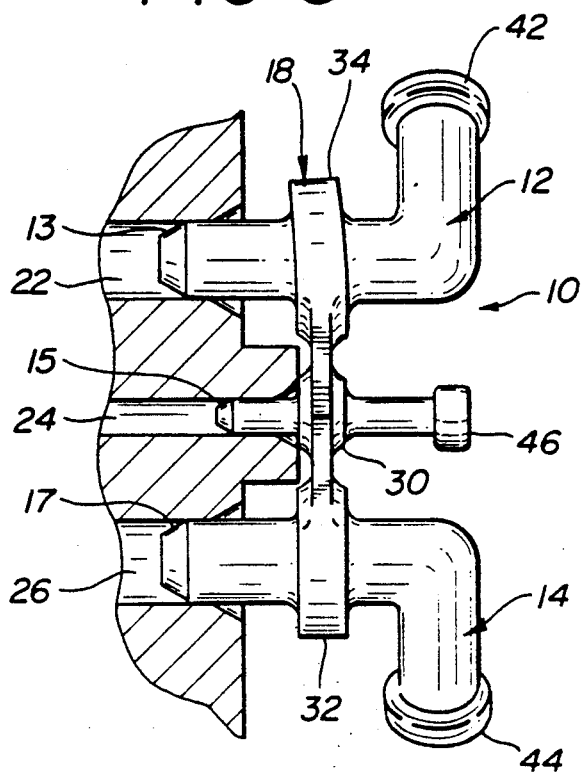
FIG. 3 is a side view of the fluid direction tube insertion assembly after having been inserted into an automobile engine body.

Reference is made to FIGS. 1-3 of the drawings which illustrate a fluid direction tube insertion assembly of the most preferred embodiment. In its basic components, the fluid direction tube insertion assembly 10 includes three thermoplastic fluid direction tubes 12, 14, 16 and a flexible bracket 18 connecting tubes 12, 14, 16. Flexible bracket 18 is capable of stretching and compressing when inserting tubes 12, 14 and 16 into the sometimes misaligned bores of an engine body.

Referring specifically to FIG. 1, there is shown the fluid direction tube insertion assembly 10 being inserted into the inboard bore 22 and outboard bore 26 of an automobile engine body 20. Also shown is a center bore 24 of an automobile engine body 20. The bores have chamfers 23, 25, and 27 therein. The preferred fluid direction tube insertion assembly 10 includes an inboard fluid direction tube 12, an outboard fluid direction tube 14, and a center fluid direction tube 16, all having chamfers thereon, designated 13, 15 and 17, respectively. Outboard tube 12 and inboard tube 14 have equal diameters which are larger than the center tube 16 diameter.

The fluid direction tube insertion assembly 10 of FIG. 1 also has flexible bracket 18 which is centrally positioned between inboard fluid direction tube 12, center fluid direction tube 16 and outboard fluid direction tube 14. Flexible bracket 18 is made from a material capable of stretching and compressing so as to provide a fluid direction tube insertion assembly 10 with insertion flexibility. By providing a flexible bracket 18, fluid direction tube insertion assembly 10 can flex and compress when inserting fluid direction tubes 12, 14 and 16 into the sometimes misaligned automobile engine bores (referred to in FIG. 1 as inboard bore 22, outboard bore 26 and center bore 24). In effect, fluid direction tube insertion assembly 10 self-aligns itself with bores 22, 24, 26 thus simplifying the insertion process. Consequently, manufacturing costs and time are reduced. The fact that the flexible bracket is made of an engineering elastomer contributes to the cost savings.

The preferred engineering elastomer for use as the flexible bracket is Lomod B0220 from General Electric Co., Pittsfield, Mass. The reported physical characteristics for Lomod B0220 are as follows:

| PROPERTY | ASTM TEST METHOD | LOMOD BO220 |
|---|---|---|
| Electrical | | |
| Dielectric Strength, volts/mil | D495 | |
| @ ⅛" (3.2 mm) | | 400 |
| @ 1/16" (1.6 mm) | | 540 |
| Dielectric Constant | D150 | |
| @ 73° F. (23° C.) | | |
| @ 100 Hz | | 4.52 |
| @ 1,000 Hz | | 4.44 |
| @ 100,000 Hz | | 4.19 |
| Dissipation Factor | D150 | |
| @ 73°F. (23° C.) | | |
| @ 100 Hz | | 0.018 |
| @ 1,000 Hz | | 0.015 |
| @ 100,000 Hz | | 0.034 |
| Volume Resistivity, ohm-cm | D257 | $2.16 \times 10^{12}$ |
| @ 73° F. (23° C.) | | |
| Physical | | |
| Specific Gravity | D792 | 1.19 |
| Water Absorption, % | D670 | 0.81 |
| Mold Shrinkage, mil/in % | D955 | |
| Flow Direction | | 19–23 (1.9–2.3) |
| Cross Flow Direction | | 19–23 (1.9–2.3) |
| Mechanical | | |
| Flexural Modulus, psi (MPa) | D790 | 17,000 (117) |
| Tensile Strength, psi (MPa) | D638 | 2,800 (17.9) |
| Tensile Elongation, % @ Break | D638 | 160 |
| Tear Strength, lbs/in (kN/m) | D624 | |
| Die Cut C | | 730 (5.0) |
| Molded | | 730 (5.0) |
| Ross Flex Cut Growth Resistance, cycles Pierced, @ 73° F. (23° C.) | D1062 | — |
| Taber Abrasion H-16 Wheel, mg 1000 cycles | D0144 | 225 |
| Notched Izod Impact, ft-lbs/in (J/m) @ 73° F. (23° C.) | D256 | NB |
| Rockwell Hardness (Shore D) | D2240 | 47 |
| Thermal | | |
| Vicat Softening Temp. °F. (°C.) | D1525 | 329 (165) |
| Coefficient of Thermal Expansion | D696 | |
| @ -20 to 150° C. metric | | $0.97 \times 10^{-4}$ ($1.4 \times 10^{-4}$) |
| @ -20 at 100° C. metric | | |
| Cross Flow Direction, | | |
| in/in/°F. | | $0.96 \times 10^{-4}$ |
| mm/mm/°C. | | ($1.76 \times 10^{-4}$) |

Alternatively, it is possible to make the flexible bracket from the same material as the thermoplastic fluid direction tubes. Preferrably that thermoplastic material has a coefficient of thermal expansion about the same as that of the automobile engine body or part thereof into which it is to be inserted.

Thus, the engine body 20 is preferably made of aluminum or a thermoset phenolic resin capable of withstanding the adverse effects of high temperature automotive fluids. Similarly, thermoplastic fluid direction tubes 12, 14 and 16 are preferably injection molded from a thermoplastic material having a heat softening temperature of at least 180° C. so as to withstand the high temperature automotive fluids. Preferably, the thermoplastic material must also withstand the heat of an automotive engine which can reach 180° C.

Preferred thermoplastic materials are glass filled polyester resins such as Valox 420 resin, also from General Electric, and glass filled polyetherimide resins such as Ultem 2000 series resin from General Electric. Both are thermoplastic resins having high heat resistance, dimensional stability in harsh environments, low moisture absorption, good strength and modulus, and are processable on conventional molding equipment.

The reported physical characteristics for Valox 420 resin are as follows:

| Property | SI Units | ASTM Test Method | VALOX 420 resin 30% Glass reinforced |
|---|---|---|---|
| Physical | | | |
| Specific Gravity | | D792 | 1.53 |
| Specific Volume | in³ lb (cm/kg) | — | 18.2 (655) |
| Water Absorption, 24 hours | % | D570 | 0.06 |
| Mold Shrinkage | in/in × 10⁻³ mm/mm × 10⁻³ | | |
| (Flow Direction) | 30–90 mil (.76–2.3 mm) | | 4–6 |
| | 90–180 mil (2.3–4.6 mm) | | 6–7 |
| (Cross Flow Direction) | 30–90 mil (.76–2.3 mm) | | 5–8 |
| | 90–180 mil (2.3–4.6 mm) | | 8–10 |
| Mechanical | | | |
| Tensile Strength | psi (MPa) | D638 | 17,300 (119) |
| Elongation at Break | % | D638 | 3 |
| Flexural Strength | psi (MPa) | D790 | 27,500 (189) |
| Flexural Modulus | psi (MPa) | D790 | 1,100,000 (7,600) |
| Compressive Strength | psi (MPa) | D695 | 18,000 (124) |
| Shear Strength | psi (MPa) | D732 | 8,900 (61) |
| Izod Impact Strength | | D256 | |
| Notched, ⅛" thick (3.2 mm) | ft-lb/in (J/m) | | 1.6 (85) |
| Unnotched ⅛" | ft-lb/in (J-m) | | |

| Property | SI Units | ASTM Test Method | VALOX 420 resin 30% Glass reinforced |
|---|---|---|---|
| thick (3.2 mm) | | | |
| Gardner impact, ⅛" thick (3.2 mm) | ft-lb (J) | Falling Dart | 15 (800) |
| Rockwell Hardness R-scale | | D785 | 118 |
| Thermal | | | |
| Heat Deflection Temperature | | D648 | |
| @ 66 psi (.46 MPa) | °F. (°C.) | | 420 (215) |
| @ 264 psi (1.82 MPa) | °F. (°C.) | | 405 (207) |
| Coeff. of Thermal Expansion | | D696 | |
| Mold Direction × $10^{-6}$ | in/in/°F. | | |
| Range: −40–100° F. (−40–40° C.) | (m/m/°C.) | | 1.4 (2.5) |
| Range: 140–280° F. (60–140° C.) | | | 1.4 (2.5) |

The reported physical characteristics for Ultem 2000 series resin are as follows:

| Property | ULTEM 2200 Resin |
|---|---|
| Physical | |
| Specific Gravity | 1.42 |
| Mold Shrinkage (cross flow) | 0.003–0.005 |
| Water Absorption | |
| 24 hours, 73° F. (23° C.) | 0.19 |
| Equilbrium, 73° F. (23° C.) | 1.10 |
| Mechanical | |
| Tensile Strength, Yield | 20,100 (140) |
| Tensile Modulus, 1% Secant | 1,000,000 (6,900) |
| Tensile Elongation, Yield | — |
| Tensile Elongation, Ultimate | 3 |
| Flexural Strength | 30,000 (210) |
| Flexural Modulus, Tangent | 900,000 (6,200) |
| Compressive Strength | 28,700 (200) |
| Compressive Modulus | 809,000 (5,600) |
| Izod Impact Strength | |
| Notched, ⅛" (3.2 mm) | 1.5 (90) |
| Unnotched, ⅛" (3.2 mm) | 9.0 (480) |
| Shear Strength, Ultimate | 13,500 (95) |
| Rockwell Hardness | M114 |
| Thermal | |
| Deflection Temperature, Unannealed | |
| @ 66 psi, ¼" (.045 MPa, 6.4 mm) | 410 (210) |
| @ 264 psi, ¼" (1.82 MPa, 6.4 mm) | 408 (209) |
| Vicat Softening Point, Method B | 428 (226) |
| Thermal Index, UL Bulletin 746B | 338 (170) |
| Coefficient of Thermal Expansion, 0 to 300° F. (−18 to 150° C.) Mold Direction | $1.4 \times 10^{-5}$ ($2.5 \times 10^{-5}$) |
| Flammability | |
| Vertical Burn, UL Bulletin 94 | |
| @ 0.016" (0.41 mm) | V-O |
| @ 0.010" (0.25 mm) | |
| NBS Smoke, Flaming Mode, 0.060" (1.5 mm) | |
| $D_3$ @ 4 min | 1.3 |
| $D_{max}$ @ 20 min | 27 |
| Oxygen Index | 50 |
| Electrical | |
| Dielectrical Strength, 1/16" (1.6 mm) | |
| in oil | 670 (26.5) |
| in air | — |
| Dielectric Constant @ 1 kHz, 50% RH | 3.5 |
| Dissipation Factor | |
| 1 kHz, 50% RH, 73° F. (23° C.) | 0.0015 |
| 2450 MHz, 50% RH, 73° F. (23° C.) | 0.0049 |
| Volume Resistivity, 1/16" (1.6 mm) | $7.0 \times 10^{16}$ ($7.0 \times 10^{14}$) |
| Arc Resistance | 85 |

Tables I and II below set forth the various percents retention of tensile strength of a thermoplastic air by-pass tube made of Valox 420 after exposure to several automotive type fluids for 30 and 90 days.

TABLE I

| Media | Immersion Days | Temperature (°C.) | VALOX 420 % retention of tensile strength |
|---|---|---|---|
| Transmission Fluid | 30 | 25 | 100 |
| | 90 | 25 | 100 |
| | 30 | 121 | 100 |
| | 90 | 121 | 80 |
| Power Steering Fluid | 30 | 25 | 100 |
| | 90 | 25 | 100 |
| | 30 | 60 | 100 |
| | 90 | 60 | 100 |
| Brake Fluid | 30 | 25 | 100 |
| | 90 | 25 | 100 |
| | 30 | 60 | 100 |
| | 90 | 60 | 98 |
| Amoco Regular | 30 | 25 | 100 |
| | 90 | 25 | 100 |
| | 30 | 60 | 93 |
| | 90 | 60 | 90 |
| Amoco Premium | 30 | 25 | 100 |
| | 90 | 25 | 100 |
| | 30 | 60 | 90 |
| | 90 | 60 | 85 |
| Amoco Unleaded | 30 | 25 | 95 |
| | 90 | 25 | 95 |
| | 30 | 60 | 86 |
| | 90 | 60 | 82 |
| Gasohol (90/10) | 30 | 25 | 95 |
| | 90 | 25 | 95 |
| | 30 | 60 | 79 |
| | 90 | 60 | 79 |
| Diesel Fuel | 30 | 25 | 100 |
| | 90 | 25 | 100 |
| | 30 | 60 | 100 |
| | 90 | 60 | 100 |

TABLE II

| Media | Immersion Days | Temperature (°C.) | VALOX 420 % retention of tensile strength |
|---|---|---|---|
| Heptane | 30 | 25 | 99 |

TABLE II-continued

| Media | Immersion Days | Temperature (°C.) | VALOX 420 % retention of tensile strength |
|---|---|---|---|
| | 90 | 25 | 99 |
| Acetone | 30 | 25 | 86 |
| | 90 | 25 | 74 |
| Methylethylketone | 30 | 25 | 90 |
| | 90 | 25 | 80 |
| Ethyl Acetate | 30 | 25 | 96 |
| | 90 | 25 | 86 |
| Methylene Chloride | 30 | 25 | 54 |
| | 90 | 25 | 54 |
| Ethylene Gylcol | 30 | 25 | 100 |
| | 90 | 25 | 100 |
| Motor Oil | 30 | 25 | 100 |
| | 90 | 25 | 100 |
| | 30 | 121 | 96 |
| | 90 | 482 | 63 |

It is evident from Tables I and II that the VALOX 420 thermoplastic resin is immune to most automotive related fluids, even at elevated temperatures. Similar immunity is shown by the Ultem 2000 series resins.

Referring now to FIG. 2, there is shown fluid direction tube insertion assembly 10 viewed from the top along line 2—2. Inboard fluid direction tube 12 and outboard fluid direction tube 14 are shown extending outwards in opposite directions. Center fluid direction tube 16 is positioned equalaterally from tubes 12, 14. Flexible bracket 18 is connected perpendicular to tubes 12, 14, 16. Flexible bracket 18 has openings to concentrically surround each insertion tube 12, 14, 16 as shown at bracket arcs 30, 32 and 34. The preferable radius of each bracket arc 30, 32, 34 is dependent upon the amount of adjustment required for the typical misaligned bores 22, 24, 26 of a particular application. In the automotive industry, the bores 22, 24, 26 may be misaligned by −1.0 mm to about +1.0 mm and the radius at bracket arcs 32 and 34 are about 150 mm and at bracket arc 30 is about 150 mm.

During the insertion of fluid direction tube insertion assembly 10, flexible bracket 18 compresses and stretches to align tubes 12, 14 and 16 with bores 22, 24, 26. In particular, FIG. 2 shows a centrally located neck 28 which stretches and compresses thus aligning tubes 12, 14, and 16 with the misaligned engine body bores 22, 24 and 26.

The flexibility of flexible bracket 18 may be provided by manufacturing flexible bracket 18 from a thermoplastic material having good elongation and flexural modulus such as Lomod B0220 from General Electric. As mentioned, in that instanced flexible bracket 18 is separately molded and, then, joined to fluid direction tubes 12, 14 and 16 to form fluid direction tube insertion assembly 10.

Alternatively, fluid direction tube insertion assembly 10 may be molded as one piece with flexible bracket 18 being made of the same thermoplastic material as fluid direction tubes 12, 14 and 16, as previously described. In that instance it is necessary to make flexible bracket 18 relatively thin, that is having a thickness in the range about 0.5-0.75 mm. It is also desirable to impart a slight concave shape to flexible bracket 18 (as shown in FIG. 1) to assist in the flexing/orientation/alignment aspect of the fluid direction tube insertion assembly 10.

Referring now to FIG. 3, fluid direction tube insertion assembly 10 is shown subsequent to insertion of fluid direction tubes 12, 14 and 16 into the bores 22, 24, 26 of engine body 20. Flexible bracket 18 is compressed and stretched in a position to ensure retention of fluid direction tube insertion assembly 10. As shown in FIG. 3, outboard fluid direction tube 12 is tightly fitted into inboard bore 22 of engine body 20. Similarly, outboard fluid direction tube 14 is fitted into outboard bore 26 and further, center fluid direction tube 16 is inserted into center bore 24.

As shown in FIG. 3, fluid direction tubes 12, 14 and 16 have hose connectors 42, 44 and 46, respectively, at the fluid discharge ends thereof for attachment of a hose (not shown) which completes the fluid conduct with other parties of the engine body 20 or other parts thereof.

Having thus described the fluid direction tube insertion assembly of the present invention and method of making and inserting same in detail and by reference to a preferred embodiment thereof, it will be apparent that certain modifications and variations are possible without departing from the scope of the invention defined in the appended claims.

What is claimed is:

1. A fluid direction tube insertion assembly for simultaneously inserting two or more fluid direction tubes into bores in an automobile engine part comprising:
    (a) at least two thermoplastic fluid direction tubes; and
    (b) a flexible bracket joining said thermoplastic fluid direction tubes in a spaced relationship, said flexible bracket having a centrally located curved neck and openings to concentrically surround each of said thermoplastic fluid direction tubes, whereby said flexible bracket allows said spaced relationship to vary for simultaneously inserting said thermoplastic fluid direction tubes into said bores.

2. The fluid direction tube insertion assembly of claim 1 wherein said thermoplastic material has a coefficient of thermal expansion of about 2.5 m/m/°C. for a temperature range from about −40° C. to about 140° C.

3. The fluid direction tube insertion assembly of claim 1 wherein said thermoplastic fluid direction tubes are made of mineral/glass reinforced thermoplastic material.

4. The fluid direction tube insertion assembly of claim 3 wherein said mineral/glass reinforced thermoplastic material is selected from the group consisting of glass reinforced thermoplastic polyester resins and glass reinforced polyetherimide resins.

5. The fluid direction tube insertion assembly of claim 3 wherein said flexible bracket is made of an engineering elastomer having a flexural modulus sufficient to permit insertion of said thermoplastic fluid direction tubes into said bores and flame retardant characteristics so as to withstand high temperature automobile fluids.

6. The fluid direction tube insertion assembly of claim 1 wherein said fluid direction tubes and said flexible bracket are made from the same thermoplastic material.

7. A fluid direction tube insertion assembly for simultaneously inserting two or more fluid direction tubes into bores in an automobile engine comprising:
    (a) at least two thermoplastic fluid direction tubes comprising an inboard fluid direction tube, an outboard fluid direction tube and a center fluid direction tube; and
    (b) a flexible bracket joining together said thermoplastic fluid direction tubes in a spaced relationship, said flexible bracket having a centrally located curved neck and openings to concentrically surround each of said thermoplastic fluid direction tubes, wherein said flexible bracket allows said spaced relationship to vary for simultaneously inserting said thermoplastic fluid direction tubes into said bores.

8. The fluid direction tube insertion assembly of claim 7 herein said inboard fluid direction tube and said outboard fluid direction tube have equal diameters and said diameters are larger than the diameter of said center fluid direction tube.

9. A fluid direction tube insertion assembly for simultaneously inserting two or more fluid direction tubes into bores in an automobile engine comprising:
   (a) at least two thermoplastic fluid direction tubes which are made from a mineral/glass reinforced thermoplastic material selected from the group consisting of glass reinforced thermoplastic polyester resins and glass reinforced polyetherimide resins; and thermoplastic material has a coefficient of thermal expansion about the same as an automobile part; and
   (b) a flexible bracket molded as one-piece with said thermoplastic fluid direction tubes in a spaced relationship; said flexible bracket having a centrally located neck and openings to concentrically surround each of said tubes and a thickness of about 0.5 to 0.75 mm; said flexible bracket is made from an engineering elastomer having a flexural modulus sufficient to permit insertion of said thermoplastic direction tubes into said bores and flame retardant characteristics so as to withstand high temperature automobile fluids.

10. The fluid direction tube insertion assembly of claim 9 wherein said flexible bracket is molded in a concave shape.

11. A method of making a fluid direction tube insertion assembly for simultaneously inserting two or more fluid direction tubes into bores in an automobile engine part thereof comprising the steps of:
   (a) forming at least two thermoplastic fluid direction tubes;
   (b) forming a flexible bracket having a centrally located neck and openings to concentrically surround each of said thermoplastic fluid direction tubes; and
   (c) molding said flexible bracket and said thermoplastic fluid direction tubes as one-piece to form said fluid direction tube insertion assembly.

12. A method of making a fluid direction tube insertion assembly for simultaneously inserting two or more fluid direction tubes into bores in an automobile engine part thereof comprising the steps of:
   (a) forming at least two thermoplastic fluid direction tubes;
   (b) forming a flexible bracket having a centrally located curved neck and openings to concentrically surround each of said thermoplastic fluid direction tubes;
   (c) joining said flexible bracket and said thermoplastic fluid direction tubes together in a spaced relationship to form said fluid direction tube insertion assembly, whereby said flexible bracket allows said spaced relationship to vary for simultaneously inserting said thermoplastic fluid direction tubes into said bores.

13. The method of claim 12 including the steps of forming said thermoplastic fluid direction tubes from a mineral/glass reinforced thermoplastic material having a coefficient of expansion about the same as an automobile part and forming said flexible bracket from an engineering elastomer having a flexural modulus sufficient to permit insertion of said thermoplastic direction tubes into said bores and flame retardant characteristics so as to withstand high temperature automobile fluids.

14. The method of claim 12 including the step of forming said thermoplastic direction tubes and said flexible bracket from the same thermoplastic material.

15. A method for simultaneously inserting fluid direction tubes into bores in an automobile part thereof comprising the steps of:
   (a) providing a fluid direction tube insertion assembly having at least two thermoplastic fluid direction tubes and a flexible bracket joining said thermoplastic fluid direction tubes in a spaced relationship;
   (b) providing an automobile engine part having at least two spaced apart bores therein into which said fluid direction tubes are to be inserted;
   (c) flexing said bracket just prior to inserting said fluid direction tubes into said bores so that each of said fluid direction tubes is aligned with a corresponding said bore; and
   (d) inserting said fluid direction tubes into said corresponding bore.

16. The method of claim 15 including the steps of providing a chamfer at the entrance to each of said bores and providing a corresponding chamfer in each of said fluid direction tubes.

17. The method of claim 15 including the steps of forming said fluid direction tubes from a thermoplastic material having a coefficient of thermal expansion about the same as an automobile part.

18. The method of claim 15 including the steps of providing a concave flexible bracket.

19. The method of claim 15 including the step of providing said fluid direction tube and said flexible bracket each formed from the same thermoplastic material.

20. A fluid direction tube insertion assembly for simultaneously inserting two or more fluid direction tubes into bores in an automobile engine comprising:
   (a) at least two thermoplastic fluid direction tubes which are made from a mineral/glass reinforced thermoplastic material selected from the group consisting of glass reinforced thermoplastic polyester resins and glass reinforced polyetherimide resins; said thermoplastic material has a coefficient of thermal expansion about the same as an automobile part; and
   (b) a flexible bracket having a curved shape and being molded as one-piece with said thermoplastic fluid direction tubes in a spaced relationship; said flexible bracket having a centrally located neck and openings to concentrically surround each of said tubes and a thickness of about 0.5 to 0.75 mm; said flexible bracket is made from an engineering elastomer having a flexural modulus sufficient to permit insertion of said thermoplastic direction tubes into said bores and flame retardant characteristics so as to withstand high temperature automobile fluids.

* * * * *

UNITED STATES PATENT AND TRADEMARK OFFICE
CERTIFICATE OF CORRECTION

PATENT NO. : 5,071,172
DATED : December 10, 1991
INVENTOR(S) : Todd A. Gross It is certified that error appears in the above-identified patent and that said Letters Patent is hereby corrected as shown below:

Col. 11, line 19,   "and thermoplastic" should read
                    --said thermoplastic--.

Col. 12, line 34,   "including the steps" should read
                    --including the step--.

Col. 12, line 38,   "including the steps" should read
                    --including the step--.

Signed and Sealed this

Fourth Day of May, 1993

Attest:

MICHAEL K. KIRK

Attesting Officer        Acting Commissioner of Patents and Trademarks